US009636901B2

(12) United States Patent
Jürgens

(10) Patent No.: US 9,636,901 B2
(45) Date of Patent: May 2, 2017

(54) METHOD FOR PRODUCING A SANDWICH PANEL WITH AN INTEGRATED REINFORCING STRUCTURE

(71) Applicant: AIRBUS OPERATIONS GMBH, Hamburg (DE)

(72) Inventor: Manuela (Richter) Jürgens, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 241 days.

(21) Appl. No.: 14/262,428

(22) Filed: Apr. 25, 2014

(65) Prior Publication Data
US 2014/0318701 A1    Oct. 30, 2014

Related U.S. Application Data

(60) Division of application No. 13/013,558, filed on Jan. 25, 2011, now Pat. No. 8,741,416, which is a
(Continued)

(30) Foreign Application Priority Data

Sep. 3, 2008 (DE) .................. 10 2008 041 788

(51) Int. Cl.
*B29C 65/00* (2006.01)
*B32B 37/00* (2006.01)
(Continued)

(52) U.S. Cl.
CPC ........... *B32B 38/04* (2013.01); *B29C 70/086* (2013.01); *B29C 70/088* (2013.01);
(Continued)

(58) Field of Classification Search
CPC ....... Y10T 428/24149; B32B 3/04; B32B 3/12; B32B 2260/021; B32B 2038/047;
(Continued)

(56) References Cited

U.S. PATENT DOCUMENTS 2,607,447 A   8/1952  Tuttle
3,173,520 A   3/1965  Fisher
(Continued)

FOREIGN PATENT DOCUMENTS

AT         386565       9/1988
CN       101146710      3/2008
(Continued)

OTHER PUBLICATIONS

International Search Report and Written Opinion for PCT/EP2009/060778 dated Oct. 20, 2009.
(Continued)

*Primary Examiner* — Philip Tucker
*Assistant Examiner* — Brian R Slawski
(74) *Attorney, Agent, or Firm* — Jenkins, Wilson, Taylor & Hunt, P.A.

(57) ABSTRACT

A Sandwich panel with a core structure, in particular with a honeycomb-shaped core structure, and plane-parallel cover layers applied to both sides of this core structure, to form a floor surface in a fuselage airframe of an aircraft, the core structure having at least one recess into which at least one reinforcing structure is integrated, wherein the at least one reinforcing structure is formed with at least one core, said core having at least one recess into which a stopper is introduced, into which at least one attachment element can be introduced to attach at least one further component to the sandwich panel, and a plurality of prepreg strips which each have a uniform fiber running direction being wound around
(Continued)

the core. In addition, the invention relates to a method for the production of a sandwich panel according to the invention.

4 Claims, 2 Drawing Sheets

Related U.S. Application Data continuation of application No. PCT/EP2009/060778, filed on Aug. 20, 2009.

(60) Provisional application No. 61/190,864, filed on Sep. 3, 2008.

(51) Int. Cl.

| | | |
|---|---|---|
| *B65H 81/00* | (2006.01) | |
| *H01F 41/12* | (2006.01) | |
| *B31C 3/00* | (2006.01) | |
| *B32B 38/04* | (2006.01) | |
| *C08J 5/00* | (2006.01) | |
| *B32B 3/12* | (2006.01) | |
| *B29C 70/08* | (2006.01) | |
| *B29C 70/86* | (2006.01) | |
| *B29D 24/00* | (2006.01) | |
| *B29D 99/00* | (2010.01) | |
| *B32B 3/08* | (2006.01) | |
| *B29C 73/06* | (2006.01) | |
| *B64C 1/18* | (2006.01) | |
| *B32B 5/12* | (2006.01) | |
| *B32B 5/18* | (2006.01) | |
| *B32B 5/22* | (2006.01) | |
| *B32B 5/24* | (2006.01) | |
| *B32B 5/26* | (2006.01) | |
| *B32B 7/04* | (2006.01) | |
| *B32B 7/12* | (2006.01) | |
| *B32B 3/02* | (2006.01) | |
| *B32B 3/04* | (2006.01) | |
| *B32B 3/14* | (2006.01) | |
| *B29K 105/08* | (2006.01) | |
| *B29L 31/30* | (2006.01) | |
| *B29L 31/60* | (2006.01) | |

(52) U.S. Cl.
CPC ............ *B29C 70/865* (2013.01); *B29C 73/06* (2013.01); *B29D 24/005* (2013.01); *B29D 99/0021* (2013.01); *B32B 3/02* (2013.01); *B32B 3/04* (2013.01); *B32B 3/08* (2013.01); *B32B 3/12* (2013.01); *B32B 3/14* (2013.01); *B32B 5/12* (2013.01); *B32B 5/18* (2013.01); *B32B 5/22* (2013.01); *B32B 5/245* (2013.01); *B32B 5/26* (2013.01); *B32B 7/045* (2013.01); *B32B 7/12* (2013.01); *B64C 1/18* (2013.01); *B29K 2105/0881* (2013.01); *B29L 2031/3076* (2013.01); *B29L 2031/608* (2013.01); *B32B 2038/047* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/50* (2013.01); *B32B 2307/544* (2013.01); *B32B 2605/18* (2013.01); *Y02T 50/433* (2013.01); *Y02T 50/47* (2013.01); *Y10T 156/1056* (2015.01); *Y10T 428/24149* (2015.01); *Y10T 428/24157* (2015.01)

(58) Field of Classification Search
CPC ..... B29C 70/443; B29C 70/865; B29C 73/06; B29C 65/00; B29C 65/48; B29C 65/483; B29C 65/56; B29C 65/565; B29L 2031/608
USPC ......... 156/60, 91, 92, 94, 98, 153, 182, 184, 156/185, 190, 191, 192, 250, 252, 256, 156/293, 303.1, 307.1, 307.7, 313; 428/116, 117, 118
See application file for complete search history.

(56) References Cited

U.S. PATENT DOCUMENTS

| | | |
|---|---|---|
| 4,076,877 A | 2/1978 | Tanzen |
| 4,265,688 A | 5/1981 | Gorski |
| 4,662,587 A | 5/1987 | Whitener |
| 4,855,182 A | 8/1989 | Ondrejas et al. |
| 5,632,834 A | 5/1997 | Ostertag et al. |
| 5,904,972 A | 5/1999 | Tunis et al. |
| 5,994,640 A * | 11/1999 | Bansemir .................. B32B 3/12 136/244 |
| 6,095,547 A | 8/2000 | Vandergrift et al. |
| 6,638,466 B1 | 10/2003 | Abbott |
| 7,182,291 B2 | 2/2007 | Westre et al. |
| 8,741,416 B2 | 6/2014 | Juergens |
| 2004/0207106 A1 | 10/2004 | Reis et al. |
| 2010/0266808 A1 | 10/2010 | Klein et al. |
| 2013/0043344 A1 | 2/2013 | Ruonavaara et al. |

FOREIGN PATENT DOCUMENTS

| | | |
|---|---|---|
| DE | 4019744 A1 | 1/1992 |
| DE | 102007007554 A1 | 8/2008 |
| DE | 10 2008 041788 | 3/2010 |
| EP | 0263094 | 4/1988 |
| WO | WO 0181468 A1 | 11/2001 |
| WO | WO 2005-023526 A1 | 3/2005 |
| WO | WO 2007-012353 A1 | 2/2007 |

OTHER PUBLICATIONS

German Office Action for DE 10 2008 041 788.2 dated Feb. 20, 2012.
Chinese Office Action for Application No. 200980134543.X dated Mar. 11, 2013.
Notice of Allowance for U.S. Appl. No. 13/013,558 dated Jan. 27, 2014.
Office Action (Restriction Requirement) for U.S. Appl. No. 13/013,558, dated Mar. 14, 2012.
Non-Final Office Action for U.S. Appl. No. 13/013,558, dated Jun. 26, 2012.
Non-Final Office Action for U.S. Appl. No. 13/013,558, dated Mar. 6, 2013.
Final Office Action for U.S. Appl. No. 13/013,558, dated Aug. 23, 2013.
Advisory Action for U.S. Appl. No. 13/013,558, dated Nov. 4, 2013.

* cited by examiner

METHOD FOR PRODUCING A SANDWICH PANEL WITH AN INTEGRATED REINFORCING STRUCTURE

CROSS-REFERENCE TO RELATED APPLICATIONS

This application is a divisional of U.S. patent application Ser. No. 13/013,558 filed Jan. 25, 2011, now U.S. Pat. No. 8,741,416 which is a continuation of PCT/EP2009/060778 filed Aug. 20, 2009 and claims priority to U.S. Provisional Application No. 61/190,864, filed Sep. 3, 2008 and German Patent Application No. 10 2008 041 788.2, filed Sep. 3, 2008, the entire disclosures of which are herein incorporated by reference.

FIELD OF THE INVENTION

The invention relates to a sandwich panel with a core structure, in particular with a honeycomb-shaped core structure and plane-parallel cover layers applied on both sides of said core structure to form a floor surface in a fuselage airframe of an aircraft. The fuselage airframes of passenger aircraft are usually provided with at least one floor frame which is used, inter alia, for creating a walkable floor surface. The floor frame consists of a plurality of crossbars which are arranged in parallel behind one another and transversely to the direction of flight and are connected to annular formers of the fuselage airframe structure. In the longitudinal direction of the fuselage airframe, seat rail profiled parts which are used for attaching the passenger seats, inter alia, and also increase the rigidity of the floor frame are arranged on the crossbars in a mutually parallel spacing. Usually inserted between the seat rail profiled parts is a plurality of floor panels which are generally formed by sandwich panels approximately 1 cm thick. The floor panels have a generally honeycomb-shaped core structure which is overlaid on both sides by cover layers. The core structure of the floor panels is generally formed by Nomex® paper, while the cover layers are produced with a fiber-reinforced plastics material such as, for example, a glass fiber-reinforced phenol resin or a carbon fiber-reinforced epoxy resin.

In order to meet passengers' increasing requirements in terms of comfort, modern aircraft are fitted with a plurality of sanitary facilities and wetrooms as well as galley blocks which are arranged, distributed through the passenger cabin. In the regions of the sanitary and galley facilities, heavy loads are applied which have to be absorbed by the floor panels, that is to say, the underlying floor frame, and transferred into the fuselage airframe structure. The galley and sanitary modules are usually connected to the floor frame by so-called "hard points" which allow the load to be transferred at selected points from the module into the underlying structure and additionally allow a tolerance compensation via the connection.

According to the prior art, the galley, wetroom and sanitary modules are attached to supports which run under the floor panels and between two crossbars in the longitudinal direction of the aircraft. The "hard points" of the modules can be directly screwed, for example, into these supports.

However, where there is this type of attachment, changing the spatial position of the modules is only possible by making extensive modifications to the floor frame. Thus, it is only possible to make changes specifically desired by the clients at a considerably increased constructive effort because the floor frame has to be adapted to the altered cabin layout.

SUMMARY OF THE INVENTION

It is therefore the object of the invention to provide a sandwich panel onto which a sanitary, wetroom and/or galley module can be directly attached and the geometric dimensions of which, including the overall height, do not differ from the known standard floor panels.

This object is achieved by a sandwich panel which has the features of the claims.

Due to the fact that the core structure has at least one recess at least in certain regions, into which a reinforcing structure is integrated, it is possible for galley, wetroom or sanitary modules of a great weight to be directly attached to a sandwich panel configured according to the invention, without further supporting measures. The insertion of additional supports into the floor frame is unnecessary. Compared to the floor panels used as standard, there is no local thickening or elevation (bead).

Thus, the layout of the passenger cabin of the aircraft, in particular the spatial positioning of the sanitary and galley modules on the floor frame can be varied in a simple and rapid manner. Extensive constructive adaptations of the floor frame to the altered position of the modules are no longer necessary, since the sandwich panel according to the invention can be positioned in a locally variable and universal manner in all regions along the floor frame. The sandwich panel can therefore be positioned substantially freely in the direction of flight, i.e. parallel to the longitudinal axis (x-axis) of the aircraft.

The at least one reinforcing structure integrated locally into the core structure reinforces the core structure of the sandwich panel in particular such that forces which act vertically and parallel to the upper side of the panel can be absorbed.

A development of the sandwich panel provides that the at least one reinforcing structure is formed with at least one core.

In known sandwich panels, the main function of the core structure is to keep the cover layers in a fixed spacing from one another, while the actual load transfer takes place by means of the cover layers. As a result of directly integrating the reinforcing structure into the core structure, the sandwich panel according to the invention can also directly absorb compressive forces which act vertically to the panel surface.

A further development of the sandwich panel allows for the core to be provided at least in certain regions with at least one strip which is formed using a prepreg material, the reinforcing fibers of which each have a uniform running direction of in particular ±45°. This measure improves the mechanical strength of the core, in particular the ability thereof to transfer shearing forces.

The prepreg materials used are preferably narrow strips which have an arrangement of reinforcing fibers with, in each case, a uniform fiber run direction. A plurality of these prepreg strips which have alternating fiber orientations of +45° and −45° are wound round the core to achieve a high loading capacity mainly in the thrust direction. The prepreg material consists of reinforcing fibers which have been previously impregnated with a curable plastics material such as, for example, an epoxy resin, a polyester resin or a phenol resin. Reinforcing fibers include in particular carbon fibers, glass fibers and Aramid® fibers. The prepreg material is generally held ready on large rollers and can be easily drawn off therefrom, so that the core-wrapping operation can be automated and integrated into continuous production processes which are already available for sandwich panels.

A further development of the invention allows for at least one reinforcing structure to be provided at least in certain regions with at least one two-dimensional blank, said at least one blank being formed by a prepreg material, the reinforcing fibers of which have a running direction of 0° and/or 90°.

This configuration means that the covered core can also be loaded by tensile forces. In principle, the core can be covered by any desired sequence of prepreg materials with running directions in each case of ±45, 0° and 90° according to the requirements of the increased loading conditions provided for the sandwich panel (floor panel), as long as the shape of the core allows the preimpregnated reinforcing fiber layers to be draped without folds and laid without any gaps. The blanks of the prepreg material with a fiber orientation of 0° or 90° can generally be laid on the core only in the direction of a longitudinal or transverse axis of the core due to the greater width, to avoid a distorted drape. Alternatively, the blanks can be positioned at least in certain regions on an upper side and/or a lower side of the core, leaving free the encircling edges.

A further configuration provides that the at least one reinforcing structure can be introduced in an interlocking manner at least in certain regions into the recess inside the core structure, and forms a material bond with the recess.

This produces an effective transfer of force between the reinforcing structure and the surrounding sandwich panel. Due to the fact that the core is enwrapped by a prepreg material which has not yet cured, it does not necessarily have to be bonded into the recess. Alternatively however, the reinforcing structure can be bonded additionally with the core structure by a suitable adhesive. To further increase the strength, a filling compound formed using a curable plastics material can be introduced into a peripheral region of the core structure, i.e. into the closed-cell honeycomb which surrounds the reinforcing structure. The height of the reinforcing structure corresponds as exactly as possible to the height of the core structure of the rest of the sandwich panel, so that ideally, the reinforcing structure is embedded in the surrounding core structure of the sandwich panel in an almost complete interlocking fit and material bond, and thickenings (elevation due to bead formation) are avoided.

According to a further advantageous configuration of the sandwich panel, the at least one core is formed with a core structure, in particular with a honeycomb-shaped core structure, and/or with a rigid foam.

The use of a honeycomb-shaped core structure which is also used for the rest of the sandwich panel allows a simplified production process, since fewer starting materials have to be held in readiness. In a particularly advantageous manner, the core can be formed with the portion which has been cut out of the core structure, but in this case the external dimensions of the portion have to be reduced by an amount corresponding to a material thickness of the reinforcing layers which are to be laid later on. In this respect, the superficial shape of the core approximately corresponds to a superficial shape of the recess inside the core structure of the sandwich panel.

A further advantageous development of the sandwich panel provides that the reinforcing structure is formed by a combination of at least two reinforcing structures. This configuration means that reinforcing structures with a complex superficial shape can be formed by combining at least two reinforcing structures with a simpler basic shape. The cores of these reinforcing structures with a simpler shape, taken separately, can be covered or enwrapped by the necessary reinforcing layers in a running direction which is optimised in terms of force flow. Furthermore, dividing a complex reinforcing structure into a plurality of reinforcing structures with a simpler shape makes it easier to drape the prepreg strips over the core without any folds.

By combining, for example a cuboid core with a core which has a cuboid shape, but with inclined or bevelled trapezoidal side faces (so-called "obelisk"), it is possible in a particularly advantageous manner to construct a reinforcing structure for which the occurrence of notch stress is avoided as far as possible in the later sandwich panel. In general, the recess will have a rectangular shape.

A further advantageous configuration allows for the at least one reinforcing structure to be provided with at least one stopper, in particular a cylindrical stopper.

Inside the reinforcing structure, this measure provides an integration region for a "hard point", for example an insert, a bilateral screw-clamping piece or the like, thereby enabling a component, for example a galley module, to be directly mechanically attached to the sandwich panel. The stoppers are generally prefabricated. In the case of cylindrical stoppers, they are formed by a plurality of superimposed circular portions of a fiber-reinforced prepreg material which has not fully cured at the time of processing. After the reinforcing structure has been embedded or bonded into the core structure which is initially at least still open, and after applying the upper cover layer, the entire arrangement including the stoppers is cured all at the same moment by the application of pressure and/or temperature. The cylindrical stoppers have diameters of between 10 mm and 200 mm so that corresponding recesses or holes can be provided in the reinforcing structure. The stoppers are then covered with the prepreg strips with the reinforcing fiber layers at ±45° and the web-shaped, generally rectangular blanks with the reinforcing fiber layers at 0° or 90°.

Furthermore, the object according to the invention is achieved by a method in accordance with claim 9 for the production of a sandwich panel with a core structure, in particular with a honeycomb-shaped core structure which is provided on both sides with plane-parallel cover layers, in particular a sandwich panel according to claims 1 to 8, the method comprising the following steps:

introducing at least one recess into the core structure, introducing at least one recess into the at least one core, inserting a stopper into the recess in the core, winding round the core with strips formed using a fiber-reinforced prepreg material to form at least one reinforcing structure, introducing the reinforcing structure at least in certain regions in an interlocking manner into the at least one recess while creating a material bond, applying the cover layers to both sides of the core structure, curing the at least one reinforcing structure and the cover layers by applying pressure and/or temperature, introducing a hole into the at least one stopper at the end of the curing process, into which hole an attachment element can be introduced to attach a further component to the sandwich panel.

Due to the fact that the at least one reinforcing structure is introduced into a recess made previously in the core structure before the cover layers are applied on both sides of the core structure, i.e. said reinforcing structure is introduced into the sandwich panel which is still open, it is possible to integrate the at least one reinforcing structure into the sandwich panel. If required, the reinforcing structure can be bonded into the recess. Due to the flush embedding, it is no longer necessary to change the standard overall height of the sandwich panel or to locally thicken the sandwich panel to increase the load-bearing ability. According to the method, in step a) first of all a recess is made in the core structure, the depth of which extends over the entire height of the core structure to achieve a flush termination of the reinforcing structure. The recess can have almost any desired geometric shape, but is usually in the shape of a cuboid with vertical and/or at least two opposing, bevelled or inclined edges. In the next step b), a plurality of reinforcing layers consisting of a strip-shaped prepreg material is laid onto the core. In this respect, preferably at least two different prepreg strips in each case with a different fiber orientation of +45° or −45° are wound alternately onto the core.

The (supporting) core itself is formed for example from a rigid foam material. Alternatively, the core can also be produced from the same material which is used to form the core structure of the sandwich panel itself, i.e. for example, with a honeycomb-shaped Nomex® paper. In addition, an upper side and/or a lower side of the core can be covered with further reinforcing fiber layers in which the reinforcing fibers preferably have a running direction of 0° or 90°. The angle values in respect of the running direction of the reinforcing fibers in the prepreg strips relate in each case to an angle which exists between a longitudinal axis of the prepreg strip or their parallel outer edges and the respectively considered longitudinal axis of the reinforcing fibers. The lay or deposition angle at which the prepreg strips are laid on the core is to be distinguished therefrom. This angle which is determined between the longitudinal axis of the strip and a component edge is not constant and can vary depending on the lay site.

Thereafter, the core prepared thus is embedded in the recess in the core structure of the sandwich panel to achieve an interlocking and material bonding integration of the reinforcing structure.

The regions, adjoining the core, of the surrounding core structure of the sandwich panel can be provided with a curable filling compound to improve the transfer of forces from the reinforcing structure into the core structure. The filling compound is preferably formed using a curable plastics material, for example, an epoxy resin, polyester resin or phenol resin which is optionally fiber-reinforced or stabilised in another way. In step c), the cover layers are applied to both sides of the core structure. The cover layers are generally joined to the core structure by a suitable adhesive. In the final step d), the entire arrangement is cured. Up until the end of step d), the reinforcing structure, the two cover layers and the optional filling compound are in an uncured, i.e. still ductile state.

Further advantageous embodiments of the method are set out in the further claims.

DESCRIPTION OF EXEMPLARY EMBODIMENTS

Figure 1:
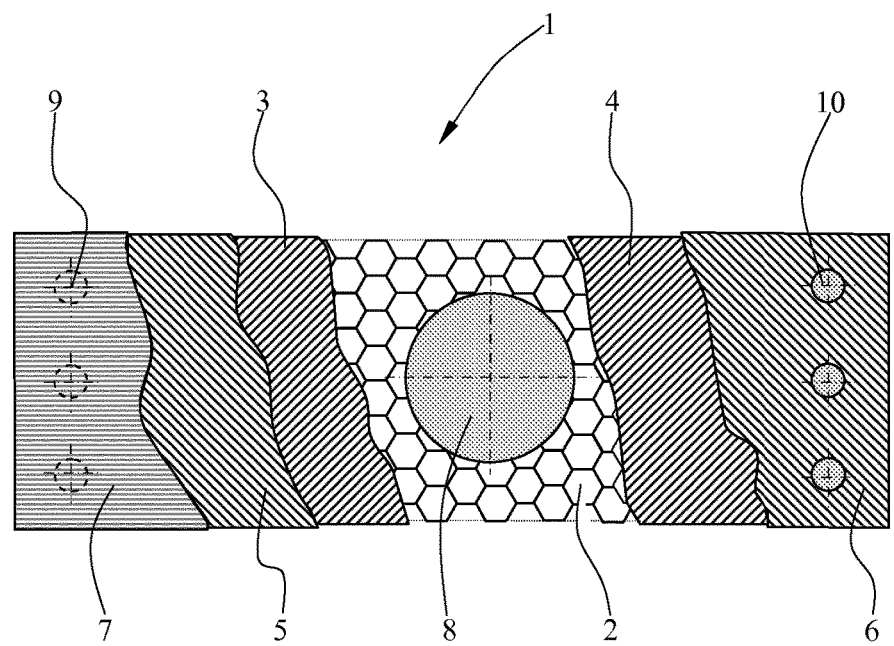
FIG. 1 is a plan view of a first, cuboid reinforcing structure with a core, onto parts of which reinforcing fiber layers have been applied.

In the drawings, the same constructive elements have the same reference numerals in each case.

FIG. 1 is a plan view of a first reinforcing structure which is provided to be embedded into a core structure of the sandwich panel according to the invention.

A first cuboid reinforcing structure 1 comprises, inter alia, a core 2 which is formed with a plurality of honeycomb-shaped cells (so-called "honeycomb") and around which a plurality of strips 3 to 6 is wound. The core 2 has a cuboid shape, the side faces being inwardly inclined all round (bevelled at an angle of 45°). The strips 3 to 6 are formed from a curable, fiber-reinforced prepreg material, the reinforcing fibers of which having different running directions. The strips 3 and 4 are formed by reinforcing fibers which have a running direction of −45°, while the strips 5, 6 wound on top have a fiber running direction of +45°. The strips 3 to 6 are covered or enwrapped by a web-shaped blank 7 which is likewise formed from a prepreg material. Unlike the strips 3 to 6, the reinforcing fibers in the blank 7 have a running direction of 0° and/or 90°.

Furthermore, a cylindrical stopper 8 with a diameter of 90 mm is introduced into a central region of the core 2. The cylindrical stopper 8 is formed by a plurality of circular cutouts, layered one on top of another and consisting of a fiber-reinforced prepreg material. A height of the stopper 8 approximately corresponds to a height of the core 2, to avoid a bead formation (i.e. thickening) of the sandwich panel. Inserted into the lateral peripheral portions of the reinforcing structure 1 are in each case three likewise cylindrical stoppers with a smaller diameter of approximately 19 mm, but with the same height as stopper 8, of which only the two upper, opposing stoppers 9, 10 have been provided with a reference numeral. The stopper 8 is used for the later integration of an attachment element (cf. in particular FIG. 4), particularly of a hard point, an insert, a screw-clamping piece or the like, thereby enabling, for example, a component to be attached by screwing to the sandwich panel according to the invention, while at the same time producing a tolerance compensation.

Figure 2:
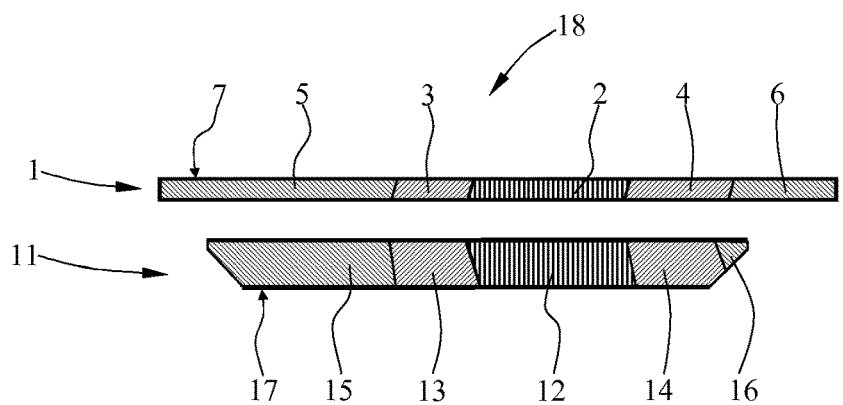
FIG. 2 is a side view of the reinforcing structure according to FIG. 1 with a second reinforcing structure arranged vertically offset underneath, with an approximately trapezoidal cross-sectional shape.

FIG. 2 is a side view of the cuboid reinforcing structure 1 according to FIG. 1 with a second reinforcing structure shown underneath in a vertically offset position and with a trapezoidal cross-sectional shape.

This results in a more complex shape of the (entire) reinforcing structure, on which nevertheless the reinforcing fiber layers of the prepreg material to be laid can be draped ideally without any folds.

The strips 3 to 6 are guided around the outer edges of the core 2 and surround it on all sides. The same applies to the blanks 7.

The second reinforcing structure 11 is formed with a cuboid core 12. Corresponding to the first reinforcing structure 1, the core 12 is covered or enwrapped all round by a plurality of strips 13 to 16 and blanks 17 of a prepreg material with a fiber orientation of ±45° and 0° and/or 90°. The stopper 8 penetrates the two reinforcing structures which are shown vertically offset to one another merely to provide a better illustration.

Both reinforcing structures 1, 11 are combined into one reinforcing structure 18 and integrated into a correspondingly configured recess (cf. FIG. 3) in a core structure of a sandwich panel to be produced.

The reinforcing structure 11, as shown in FIG. 2, is generally positioned underneath the reinforcing structure 1 in the recess of the core structure of the sandwich panel, so that the cuboid, first reinforcing structure 1 rests on one side against the upper cover layer of the sandwich panel, while the second reinforcing structure 11 with the trapezoidal cross-sectional shape rests against the lower cover layer with its shorter lower side and rests against the cuboid reinforcing structure 1 with its longer upper side.

The two reinforcing structures 1, 11 form an (entire) reinforcing structure 18, the second trapezoidal reinforcing structure 11 minimising notch stresses in the later sandwich panel. Furthermore, the prepreg materials can be draped or laid more easily around the separated reinforcing structures.

Figure 3:
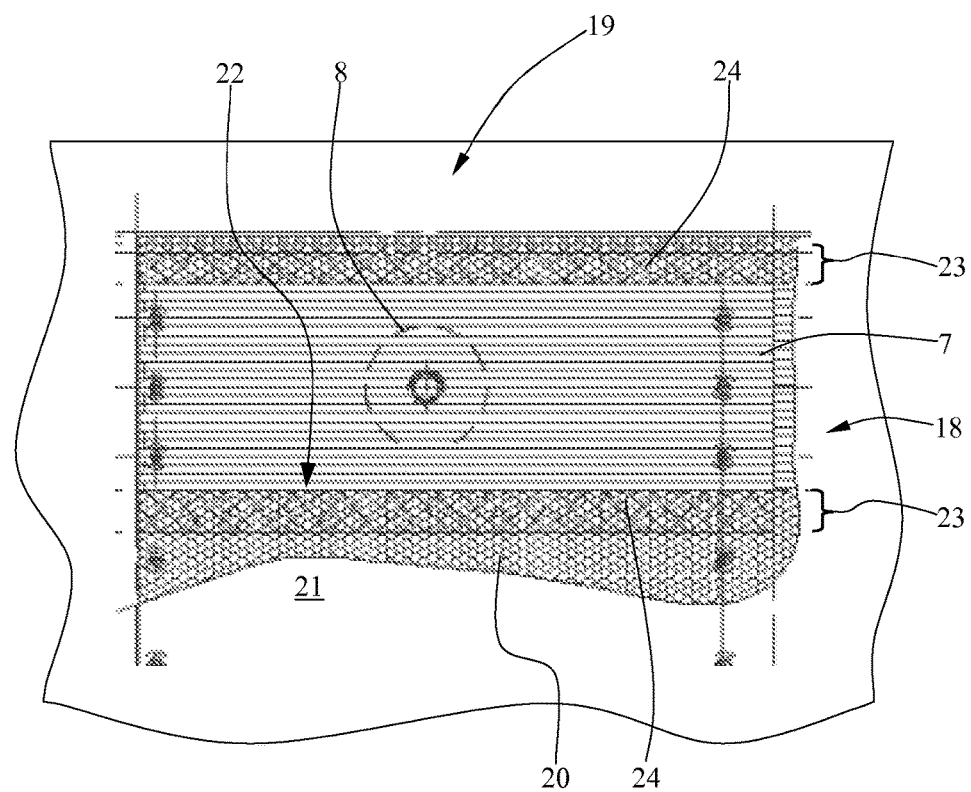
FIG. 3 is a plan view of a partial portion of a sandwich panel still open at the top, with the embedded reinforcing structure according to FIG. 2.

FIG. 3 shows a plan view of a detail of a sandwich panel which is still open at the top and has an embedded reinforcing structure.

A sandwich panel 19 with a core structure 20 is already provided on the lower side with a cover layer 21 but upwardly has not yet been closed by an upper cover layer. The complex reinforcing structure 18 formed by combining the first and second reinforcing structures 1, 11 is inserted into a recess 22. Since both reinforcing structures 1, 11 are enwrapped by adhesively acting, initially not yet cured prepreg materials, an additional adhesive bonding is not generally required. The recess 22 is configured such that it exactly fits the superficial shape of the reinforcing structure 18, to achieve an interlocking and material-locking (adhesive) integration, free from possible gaps or cavities which would reduce the mechanical loading capacity of the finished sandwich panel. In this respect, it is very important that the height of the reinforcing structure 18 to be integrated corresponds as exactly as possible to the height of the core structure 20 used, in order to avoid undesirable thickenings or local elevations of the sandwich panel 19. As a result, there is an "interlocking" bonding between the reinforcing structure 18 and the core 2 surrounding said reinforcing structure 18 along the edges.

Furthermore, the illustration of FIG. 3 shows the upper blank 7 formed by a web-shaped prepreg material which is constructed with reinforcing materials with a fiber orientation of 0°—and/or 90°. In a region 23 in which the core structure 20 adjoins the reinforcing structure 18, a suitable filling compound 24 is introduced at least into certain regions of the core structure 20 or into the honeycombs thereof. The filling compound is preferably formed by a curable plastics material which is provided, if appropriate, with a reinforcement to mechanically strengthen the material. Furthermore, the stopper 8 is indicated by a dashed line, since it is completely covered by the blank 7.

Figure 4:
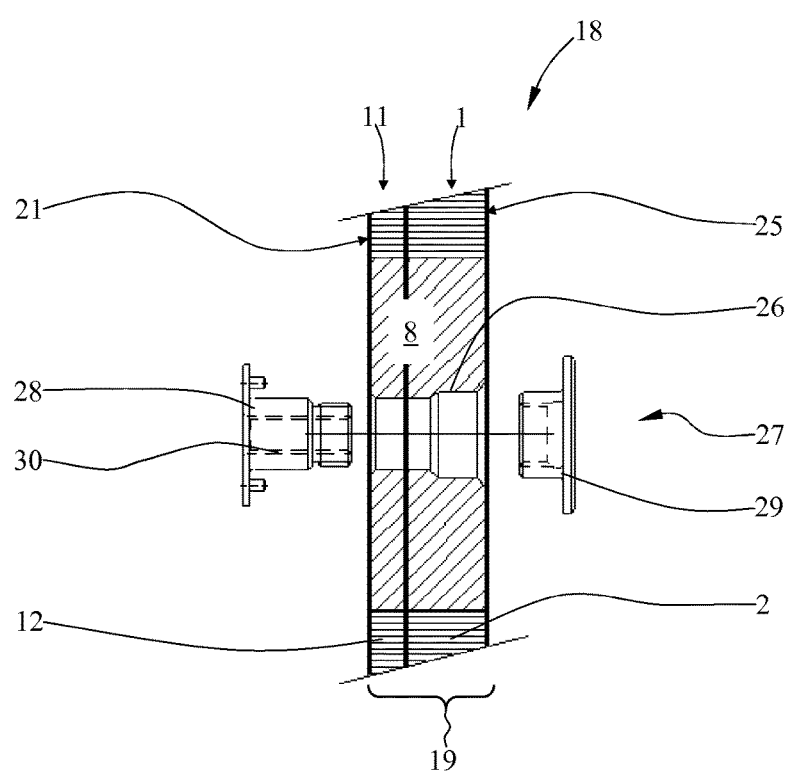
FIG. 4 is a cross-sectional view through a cylindrical stopper with an attachment element (hard point) which can be accommodated therein.

FIG. 4 is a cross-sectional view through the sandwich panel with cover layers applied to both sides in the region of the large-area, central stopper (cf. FIG. 3).

The sandwich panel 19 is provided with the cover layers 21, 25. The reinforcing structure 18 with the stopper 8 inserted therein is located between the cover layers 21, 25. A stepped hole 26 used for integrating or attaching an attachment means 27 is introduced into the stopper 8. The attachment means 27 comprises two sleeves 28, 29 which are to be connected together. The sleeves 28, 29 can be connected together, for example, by a combined screw-clamping connection. The sleeve 28 on the left-hand side has a tapped hole 30 into which a screw bolt (not shown) can be screwed to connect a further component, for example, a galley module.

As a result of the reinforcing structure 18 which is integrated according to the invention into the core structure 20, the sandwich panel 19 has a high load bearing ability while its outer geometric dimensions remain unchanged compared to the standard dimensions of the sandwich panels usually used as floor panels.

To carry out the method according to the invention, in a first step a), at least one recess 22 is made in the core structure 20 of the sandwich panel 19 to be formed. The recess 22 is to be made as precisely as possible to ensure an integration, which is ideally interlocking and material-locking, of the at least one reinforcing structure 1, 11, 18. The recess 22 can be made using, for example, a CNC-controlled milling machine. In principle, it is possible to use the worked cutout to form the recess 22 as a core for the later reinforcing structure 1, 11, 18.

Recesses or holes for receiving stoppers can then be made in the prepared cores 2, 12. The stoppers are formed using a plurality of superimposed cutout layers of a prepreg material which is initially still soft and the stoppers have, for example, a cylindrical shape with a diameter of between 10 mm and 200 mm.

In a further step b), a plurality of strips 3 to 6, 13 to 16 which are each formed using a fiber-reinforced prepreg material, are wound onto a core 2, 12. These cores 2, 12 can be formed using, for example, a rigid foam or a core structure material which corresponds to the material used to provide the core structure 20 of the sandwich panel 19. In the laying process, strips with a fiber orientation of +45° and strips with a fiber orientation of −45° are alternately laid down around the core 2, 12 in a plurality of windings. Finally, blanks 7 of a prepreg material with a fiber orientation of 0°—and/or 90°—are laid on the core 2, 12. The core 2, 12 is ideally completely surrounded by the prepreg material. Thereafter, the prepared reinforcing structure 1, 11, 18 is introduced into the recess 22. Regions of the core structure 20 adjoining the reinforcing structure 1, 11, 18, i.e. the associated honeycombs can optionally be filled with a filling compound consisting of a curable plastics material to improve the connection. For example, a strip of the core structure 20 which surrounds the embedded reinforcing structure 1, 11, 18 and has a width of up to 2.0 cm is filled as completely as possible with a curable filling compound. The reinforcing structure 1, 11, 18 can optionally also be adhesively bonded therein.

In the following step c), the cover layers 21, 25 are applied to both sides of the core structure 20. In the final step d), the entire structure is cured by applying pressure and/or temperature in suitable devices, for example, a furnace or an autoclave. In principle, it is possible to provide one side of the core structure 20 with a cover layer 21, 25 before the recess 22 is made in the core structure 20.

After the curing procedure in step d), holes or stepped holes are made in the stoppers to receive attachment elements for connecting further components to the sandwich panel. Possible examples of attachment elements include inserts or clamping-screw sleeves which can be fastened in the holes in cured stoppers.

LIST OF REFERENCE NUMERALS

1 (first) reinforcing structure
2 core (honeycomb cells)
3 strip (prepreg material, fiber orientation of −45°)
4 strip (prepreg material, fiber orientation of −45°)
5 strip (prepreg material, fiber orientation of +45°)
6 strip (prepreg material, fiber orientation of +45°)

7 blank (prepreg material, fiber orientation of 0°/90°)
8 stopper (large)
9 stopper (small)
10 stopper (small)
11 (second) reinforcing structure
12 core (honeycomb cells)
13 strip (prepreg material, fiber orientation of −45°)
14 strip (prepreg material, fiber orientation of −45°)
15 strip (prepreg material, fiber orientation of +45°)
16 strip (prepreg material, fiber orientation of +45°)
17 blank (prepreg material, fiber orientation of 0°/90°)
18 reinforcing structure (combined)
19 sandwich panel (floor panel)
20 core structure
21 (first) cover layer
22 recess
23 region
24 filling compound
25 (second) cover layer
26 stepped hole
27 attachment means
28 sleeve
29 sleeve
30 tapped hole

The invention claimed is:

1. A method for producing a sandwich panel with a core structure, the method comprising:
   introducing at least one recess into the core structure;
   introducing at least one recess into at least one core;
   inserting a stopper into the at least one recess in the at least one core;
   winding strips comprising a fiber-reinforced prepreg material around the core to form at least one reinforcing structure, wherein the strips have a uniform fiber running direction and are guided around outer edges of the core to surround the core on all sides;
   introducing the at least one reinforcing structure, at least in certain regions, in an interlocking manner into the at least one recess in the core structure while creating a material bond;
   applying cover layers to both sides of the core structure, thereby forming a sandwich panel;
   curing the at least one reinforcing structure and the cover layers by applying pressure and/or temperature; and
   introducing a hole into the stopper after curing the at least one reinforcing structure and the cover layers so an attachment element can be introduced into the hole to attach a further component to the sandwich panel.

2. The method according to claim 1, wherein at least certain regions of the at least one reinforcing structure are adhesively bonded with the at least one recess in the core structure.

3. The method according to claim 1, wherein a cover layer is joined to the core structure of the sandwich panel before the at least one reinforcing structure is introduced.

4. The method according to claim 1, wherein the core structure comprises a honeycomb-shaped core structure which is provided on both sides with substantially parallel cover layers.

* * * * *